US012794649B2

(12) United States Patent
Nakajima

(10) Patent No.: US 12,794,649 B2
(45) Date of Patent: Nov. 10, 2026

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 310 days.

(21) Appl. No.: 18/753,685

(22) Filed: Jun. 25, 2024

(65) Prior Publication Data

US 2025/0007675 A1 Jan. 2, 2025

(30) Foreign Application Priority Data

Jun. 30, 2023 (JP) ................................ 2023-108514

(51) Int. Cl.

| | |
|---|---|
| ***H04L 5/00*** | (2006.01) |
| ***H04W 8/02*** | (2009.01) |
| ***H04W 8/20*** | (2009.01) |
| ***H04W 72/0453*** | (2023.01) |

(52) U.S. Cl.

CPC ............ *H04L 5/0073* (2013.01); *H04W 8/02* (2013.01); *H04W 8/20* (2013.01); *H04W 72/0453* (2013.01)

(58) Field of Classification Search

None

See application file for complete search history.

(56) References Cited

U.S. PATENT DOCUMENTS

| | | | | |
|---|---|---|---|---|
| 2016/0073316 | A1 | 3/2016 | Calcev | |
| 2018/0034707 | A1* | 2/2018 | Aoki | H04L 41/145 |
| 2019/0320494 | A1 | 10/2019 | Jayawardene | |
| 2020/0036801 | A1 | 1/2020 | Lu | |
| 2020/0128492 | A1 | 4/2020 | Cariou | |
| 2021/0051486 | A1 | 2/2021 | Pandey | |
| 2021/0259050 | A1* | 8/2021 | Sakai | H04W 76/23 |
| 2022/0400389 | A1 | 12/2022 | Kulkarni | |
| 2023/0060887 | A1* | 3/2023 | Dominguez | H04W 12/06 |

(Continued)

FOREIGN PATENT DOCUMENTS

| | | | |
|---|---|---|---|
| CN | 104185224 | A | 12/2014 |
| JP | 2018019366 | A | 2/2018 |
| WO | 2019019016 | A1 | 1/2019 |

*Primary Examiner* — Christopher T Wyllie

(74) *Attorney, Agent, or Firm* — Canon U.S.A., Inc. IP Division

(57) ABSTRACT

A communication apparatus that performs wireless communication determines, in a case where an instruction of roaming from a first network to a second network is received from another communication apparatus after connecting to the first network, whether a first frequency channel used in the second network, and a second frequency channel used in a third network in which the communication apparatus can perform communication concurrently with the first network have a mutual interference relationship, changes, based on a fact that the first frequency channel and the second frequency channel have the mutual interference relationship, a frequency channel used in the third network to a third frequency channel having no mutual interference relationship with the first frequency channel, and executes roaming based on the instruction of roaming.

18 Claims, 9 Drawing Sheets

(56) References Cited

U.S. PATENT DOCUMENTS

| | | | | |
|---|---|---|---|---|
| 2023/0422020 | A1 | 12/2023 | Lalam | |
| 2024/0334275 | A1* | 10/2024 | Gundavelli | H04W 36/023 |
| 2024/0381066 | A1* | 11/2024 | Barton | H04W 8/02 |
| 2024/0381244 | A1* | 11/2024 | Henry | H04W 64/006 |
| 2025/0007675 | A1* | 1/2025 | Nakajima | H04W 8/02 |
| 2025/0008465 | A1* | 1/2025 | Nakajima | H04W 48/20 |
| 2025/0048464 | A1* | 2/2025 | Chu | H04W 36/08 |
| 2025/0386269 | A1* | 12/2025 | Tsunekawa | H04W 36/08 |
| 2026/0101179 | A1* | 4/2026 | Barton | H04W 8/26 |

* cited by examiner

COMMUNICATION APPARATUS, CONTROL METHOD, AND COMPUTER-READABLE STORAGE MEDIUM

BACKGROUND OF THE INVENTION

Field of the Invention

The present invention relates to a control technique of suppressing generation of interference in a wireless communication system.

Description of the Related Art

A wireless local area network (LAN) has been widely used. In the wireless LAN, a communication apparatus operates as an access point (AP) or a station (STA), and a STA joins a network formed by an AP to perform communication. Technical standards for various kinds of communication control of the wireless LAN are being developed by Wi-Fi Alliance that has spread the use of the wireless LAN. As one of the technical standards, the Wi-Fi Agile Multiband® standard is developed. According to this standard, an AP can collect information of surrounding networks from a STA connected to the AP, and based on the information, prompt the connected STA to shift to another network. By shifting the connected STA to another network by the AP, the load of the network can be distributed to efficiently use network resources.

A communication apparatus in a wireless LAN can operate as a STA concurrently while operating as an AP (see Japanese Patent Laid-Open No. 2018-019366). When the communication apparatus as a STA changes a connection destination network in accordance with a network shift instruction from a connected AP, it may unintentionally degrade the communication performance depending on the relationship with a network formed by the communication apparatus as an AP. For example, when a shift destination network for the communication apparatus as a STA uses the same frequency as that of a network formed by the communication apparatus as an AP, communications performed respectively in these networks can interfere with each other. This is not limited to the wireless LAN, and interference between networks can occur owing to shift from one network to another in a wireless communication apparatus that performs communications in a plurality of networks.

SUMMARY OF THE INVENTION

The present invention provides a technique of suppressing generation of interference between networks owing to shift from one network to another in a communication apparatus that performs communications in a plurality of networks.

According to one aspect of the present invention, there is provided a communication apparatus comprising: a communication unit configured to perform wireless communication; a determination unit configured to, in a case where an instruction of roaming from a first network to a second network is received from another communication apparatus after connecting to the first network, determine whether a first frequency channel used in the second network, and a second frequency channel used in a third network in which the communication apparatus can perform communication concurrently with the first network have a mutual interference relationship; a change unit configured to change, based on a fact that the first frequency channel and the second frequency channel have the mutual interference relationship, a frequency channel used in the third network to a third frequency channel having no mutual interference relationship with the first frequency channel; and an execution unit configured to execute roaming based on the instruction of roaming.

Further features of the present invention will become apparent from the following description of exemplary embodiments with reference to the attached drawings.

DESCRIPTION OF THE EMBODIMENTS

Figure 1:
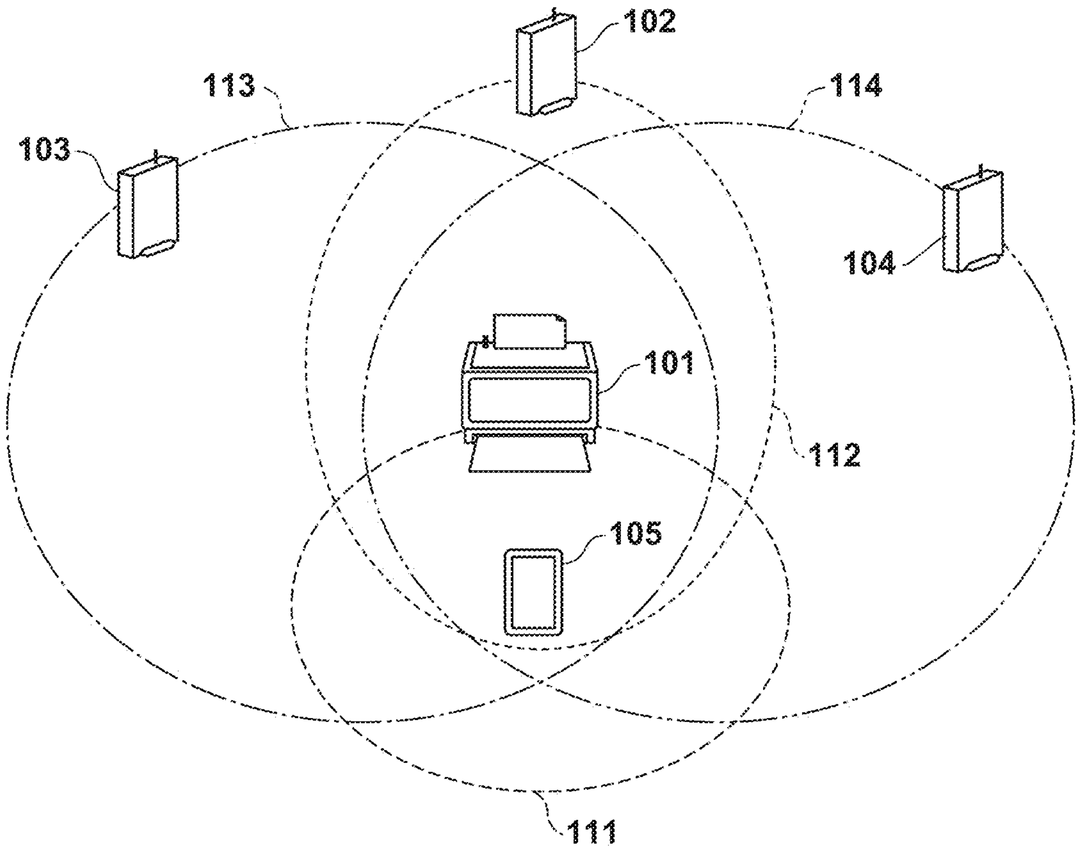
FIG. 1 is a view showing an example of the configuration of a communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

FIG. 1 shows an example of the configuration of a wireless communication system according to an embodiment. The wireless communication system in FIG. 1 is a system constituted using a wireless local area network (LAN) compliant with the IEEE 802.11 series standard. For example, the wireless communication system is constituted using a wireless LAN compliant with at least any one of the IEEE 802.11a/b/g/n/ac/ax/be standards. Note that IEEE stands for Institute of Electrical and Electronics Engineers. Although attention is paid to a wireless LAN in the following description, similar discussions can be applied to another wireless network. For example, it is also possible to rewrite an access point (AP) into a base station, rewrite a station (STA) into a terminal, and apply the following discussions to a system using an arbitrary wireless network.

The wireless communication system includes a plurality of communication apparatuses. Each communication apparatus has the function of at least either of an access point (AP) having a function of forming a network, and a STA that joins a network formed by an AP. In the embodiment, a printer 101 can function as both an AP and a STA, form a network 111 of a wireless LAN, and join any one of networks formed by APs 102 to 104. Note that an operation mode of the printer 101 as an AP will be called an AP mode, and an operation mode of the printer 101 as a STA will be called a STA mode. Each of the APs 102 to 104 forms a network of the wireless LAN. FIG. 1 shows an example in which the AP 102 forms a network 112, the AP 103 forms a network 113, and the AP 104 forms a network 114. In the following description, a formed network of the wireless LAN is sometimes called Basic Service Set (BSS). In the embodiment, the printer 101 joins as a STA, for example, the network 112. Also, for example, a STA 105 joins the network 111 formed by the printer 101.

Here, a network is constituted so that the APs 102 to 104 can communicate with each other via a backbone network (not shown), and a STA connected to any one of the APs can perform roaming between these APs. The backbone network may be constituted as, for example, a wired network such as a wired LAN or a wireless network such as a wireless LAN.

Note that each communication apparatus may comply with another communication standard such as Bluetooth®, NFC, UWB, ZigBee, or MBOA, in addition to the IEEE 802.11 series standard. Note that UWB stands for Ultra Wide Band, MBOA stands for Multi Band OFDM Alliance, and NFC stands for Near Field Communication. OFDM stands for Orthogonal Frequency Division Multiplexing. UWB includes a wireless USB, wireless 1394, WiNET, and the like. The communication apparatus may comply with a standard such as the Wi-Fi Direct standard developed by Wi-Fi Alliance, in addition to the IEEE 802.11 series standard. Also, the communication apparatus may comply with a communication standard of wired communication such as a wired LAN.

In the embodiment, when the printer 101 operates in both the STA mode and the AP mode, it can use frequency bands different between the respective modes. For example, while joining a network formed using the 2.4 GHz band in the STA mode, the printer 101 can form a 5 GHz-band network in the AP mode. The printer 101 may use different frequency channels of the same frequency band in the STA mode and the AP mode. For example, while joining a network formed using a channel belonging to W53 of the 5 GHz band in the STA mode, the printer 101 may form a network using a channel belonging to W52 of the same 5 GHz band. That is, the printer 101 can use such frequency channels as to prevent mutual interference between communications in the STA mode and the AP mode or sufficiently reduce the interference. Since interference between adjacent channels in the 5 GHz band is smaller than that in the 2.4 GHz band, the printer 101 may use adjacent channels in the 5 GHz band. The printer 101 may operate at 6 GHz, in addition to 2.4 GHz and 5 GHz.

In the embodiment, 1 ch in the 2.4 GHz band is used in the network 112, and 6 ch in the 2.4 GHz band is used in the networks 111 and 113. Note that "ch" means "channel". In the network 114, 11 ch is used. The networks 112 to 114 are wireless networks capable of roaming that are respectively set to have, for example, the same Service Set Identifier (SSID), the same passphrase, or the like necessary for encryption and decryption of communication. Note that this is merely an example, and arbitrary setting can be performed so that roaming can be executed between the networks 112 to 114.

According to the embodiment, in order to efficiently use a network, communication apparatuses can exchange network information to perform dynamic monitoring of the network, balance adjustment of the network load based on information, and the like. In the embodiment, the printer 101, the APs 102 to 104, and the STA 105 comply with the Wi-Fi Agile Multiband standard developed by Wi-Fi Alliance. According to the Wi-Fi Agile Multiband standard, an AP can collect information of surrounding networks from a STA connected to the AP, and based on the information, prompt the connected STA to shift to another network. For example, the AP 102 can collect information of networks present around the AP 102 from the printer 101 connected to the AP 102, and transmit an instruction to the printer 101 to shift to a network formed by another AP. The AP can decide shift of the connected STA to another network in accordance with the use status (load status) of resources in the surrounding network and the network formed by the AP. Note that this is merely an example, and the AP may decide shift of the STA to another network based on another policy.

Here, procedures executed when an AP instructs a STA to shift to another network in accordance with the Wi-Fi Agile Multiband standard, that is, when an AP instructs a STA about roaming will be generally described.

When a connection partner apparatus complies with (supports) the Wi-Fi Agile Multiband standard, an AP and a STA can execute the function. Based on whether a radio frame transmitted from the AP includes MBO Capability Indication information, the STA can determine whether the AP complies with the Wi-Fi Agile Multiband standard. For example, when the radio frame transmitted from the AP includes MBO Capability Indication information, the STA can determine that the AP complies with the Wi-Fi Agile Multiband standard. Note that MBO stands for Multiband Operation. Alternatively, based on other information such as whether a BTM Capability bit is set in the radio frame transmitted from the AP, the STA may determine whether the AP complies with the Wi-Fi Agile Multiband standard. For example, when the BTM Capability bit is set in the radio frame transmitted from the AP, the STA can determine that the AP complies with the Wi-Fi Agile Multiband standard. Note that BTM stands for BSS Transition Management. The radio frame transmitted from the AP can be Beacon, Probe Response, or Association Response. These are merely an example, and whether the AP complies with the Wi-Fi Agile Multiband standard may be determined based on another radio frame.

Also, based on whether a BTM Capability bit is set in a radio frame transmitted from the STA, the AP can determine whether the STA complies with the Wi-Fi Agile Multiband standard. For example, when the BTM Capability bit is set in the radio frame transmitted from the STA, the AP can determine that the STA complies with the Wi-Fi Agile Multiband standard. The radio frame can be, for example, Probe Request or Association Request. Note that these are merely an example, and whether the STA complies with the Wi-Fi Agile Multiband standard may be determined based on another radio frame.

In the following description, both the AP and the STA comply with the Wi-Fi Agile Multiband standard.

The AP transmits a Beacon Request frame to the connected STA. The Beacon Request frame is a frame that instructs the STA to collect Beacon information of a surrounding AP. When the STA receives the Beacon Request frame, it observes Beason transmitted from surrounding APs based on information in the frame, and collects Beacon information. The STA generates a Beacon Report frame including the collected information, and transmits the frame to the AP. Based on the load status of the network formed by the AP and information such as Beacon Report received from the STA, the AP can decide whether to perform roaming of the STA to another network. When the AP decides to perform roaming of the STA to another network, it instructs the STA about roaming by using, for example, a BTM Request frame. The BTM Request frame can include a roaming destination BSS candidate list, the time until a disconnection frame is transmitted, the time until roaming can start, priority information of the BSS candidate list, and the like. When the STA receives the BTM Request frame, it decides based on information included in the frame whether to execute roaming. The STA generates a BTM Response frame based on the decision, and transmits the frame to the AP. The BTM Response frame can include information of whether to accept roaming, and when executing roaming, identification information (BSSID) of a roaming destination network.

In the above-described way, the AP and the STA can perform roaming compliant with the Wi-Fi Agile Multiband standard. At the time of roaming, a roaming method compliant with the Wi-Fi Agile Multiband standard may be directly used, or only some functions of the standard may be used. Another standard that is different from the Wi-Fi Agile Multiband standard and implements similar functions may be used.

In the embodiment, the printer 101 as a communication apparatus operable as both an AP and a STA changes a connection destination network in the STA mode in accordance with the Wi-Fi Agile Multiband standard. In this case, a frequency channel used in the AP mode and a frequency channel used in a connection destination network after change in the STA mode can strongly interfere with each other. More specifically, assume that the printer 101 uses 6 ch in the AP mode and is connected in the STA mode to the network 112 that uses 1 ch. In this case, when the AP 102 instructs the printer 101 about roaming to the network 113 and the printer 101 performs roaming in accordance with the instruction, 6 ch is used in both the AP mode and the STA mode. In this case, communication in the AP mode and communication in the STA mode can interfere with each other. Considering this situation, the embodiment provides a technique of suppressing generation of interference between communication in the AP mode and communication in the STA mode at such a level as to influence communication along with roaming.

Apparatus Configuration

Figure 2:
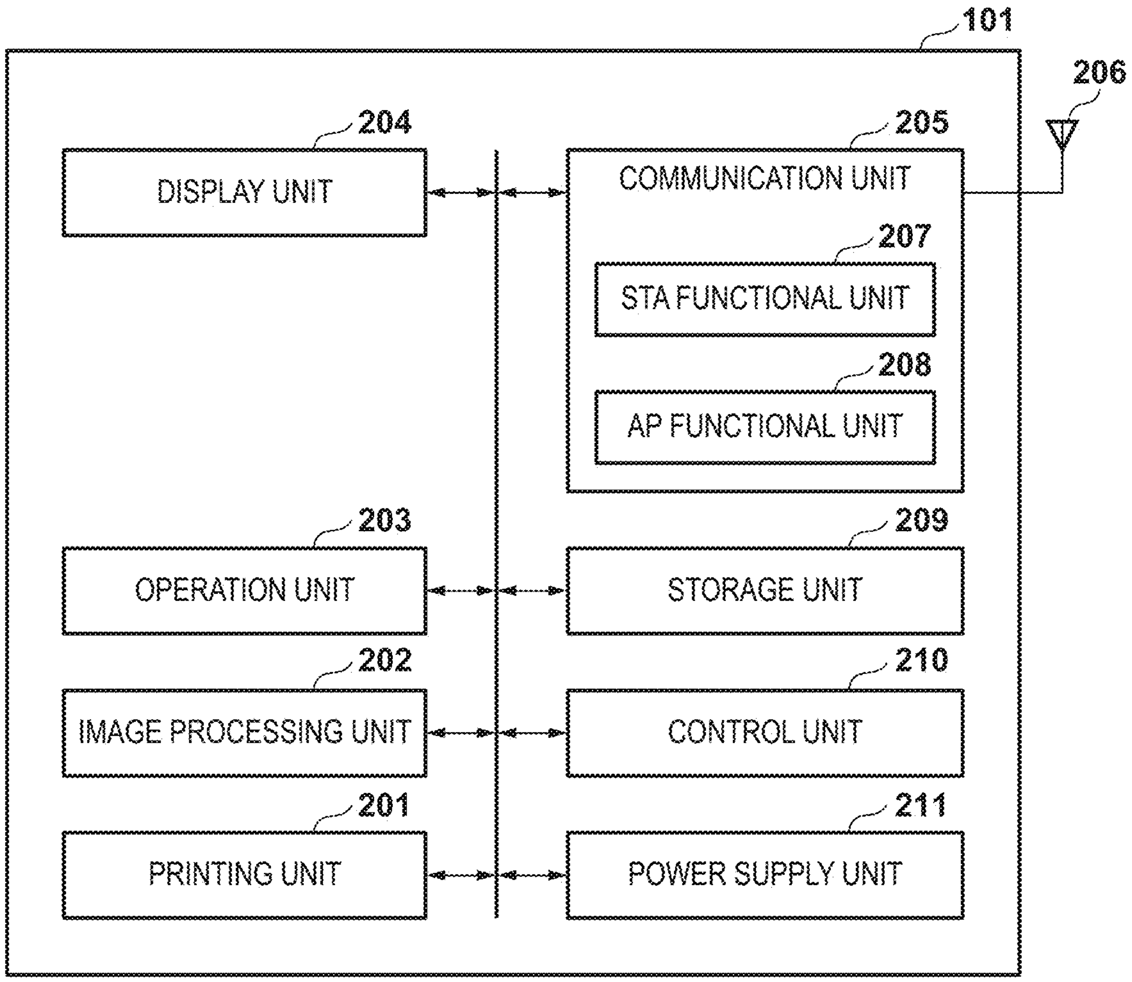
FIG. 2 is a block diagram showing an example of the configuration of a printer.

FIG. 2 shows an example of the hardware configuration of the printer 101 according to the embodiment. As the hardware configuration, the printer 101 includes, for example, a printing unit 201, an image processing unit 202, an operation unit 203, a display unit 204, a communication unit 205, an antenna 206, a storage unit 209, a control unit 210, and a power supply unit 211. The printing unit 201 performs print processing. The printing unit 201 includes, for example, a sheet conveyance mechanism and a print processing mechanism. The image processing unit 202 performs image processing on an image to be printed before the printing unit 201 performs print processing. The image processing unit 202 includes, for example, image processing hardware and a memory for converting an input image to be printed into data suited to printing by the printing unit 201. The operation unit 203 accepts various inputs and the like for operating the printer 101 by the user. The operation unit 203 includes, for example, buttons and keys for accepting various operations. The operation unit 203 may include hardware for accepting an input such as an audio input, other than inputs from buttons and keys. The display unit 204 includes a display and a light-emitting diode that output information in a visually recognizable form, a loudspeaker that outputs information by voice, and the like. In an example, the display unit 204 outputs information in a form recognizable at least either visually or aurally. Note that this is merely an example, and information may be displayed by vibration or the like. When the display unit 204 displays visual information, it has a Video Random Access Memory (VRAM) that holds screen data corresponding to visual information to be displayed. In an example, the display unit 204 performs display control to keep displaying screen data stored in the VRAM. For example, a touch panel display obtained by integrating the display unit 204 and the operation unit 203 may be used.

The communication unit 205 includes a radio frequency (RF) circuit and a baseband circuit (wireless LAN chip) for a wireless LAN that provide a communication interface by the wireless LAN. The communication unit 205 is constituted so that it can execute wireless LAN communication compliant with the IEEE 802.11 series standard via the antenna 206. The antenna 206 uses, as an operation frequency band, the 2.4 GHz band/5 GHz band for performing wireless LAN communication. In addition, the antenna 206 may use the 6 GHz band as an operation frequency band. Note that the communication unit 205 includes a STA functional unit 207 and an AP functional unit 208 so that it can concurrently execute an operation in the STA mode and an operation in the AP mode. The STA functional unit 207 and the AP functional unit 208 may be implemented as different radio I/Fs or may share one radio I/F. When one radio I/F is shared, for example, it can be controlled by time division not to operate the STA functional unit 207 and the AP functional unit 208 at the same time. Alternatively, one radio I/F may be shared by, for example, operating the STA functional unit 207 and the AP functional unit 208 in different frequency bands.

The storage unit 209 stores various kinds of information such as a control program to be executed by the control unit 210, and information about communication. The storage unit 209 includes, for example, one or more storage media such as a hard disk drive (HDD), a flash memory, a removable SD card, and at least one or more memories such as a ROM and a RAM. Note that ROM stands for Read Only Memory, and RAM stands for Random Access Memory. The control unit 210 controls the whole printer 101 by executing a control program stored in the storage unit 209. The control unit 210 includes at least one or more processors such as a Central Processing Unit (CPU) and a Micro Processing Unit (MPU). Note that the control unit 210 may control the whole printer 101 in cooperation with an Operating System (OS). The control unit 210 may control the whole printer 101 using information input via the operation unit 203. The information that is input via the operation unit 203 and should be stored in the printer 101 is stored in the storage unit 209. Various operations to be described later are implemented by executing control programs stored in the storage unit 209 by the control unit 210. The power supply unit 211 supplies power to each hardware unit. The power supply unit 211 can obtain power from an AC power supply such as a commercial power supply, or a DC power supply such as a battery.

Processing Sequence

An embodiment regarding procedures for suppressing generation of interference between communication in the AP mode and communication in the STA mode at such a level as to influence communication along with roaming in the printer 101 will be explained.

First Embodiment

When connecting to an AP, a STA can transmit, to the AP, an Association Request frame including information of a channel incapable of roaming by the STA. For example, the STA can transmit, to the AP, an Association Request frame in which a channel incapable of roaming by the STA is set in a Non-preferred Channel Report attribute. The STA can perform a similar notification even in a Reassociation Request frame. Further, the STA can notify the AP of information of a channel incapable of roaming even in a state in which the STA connects to the AP. For example, the STA can transmit, to the AP, a WNM-Notification Request frame in which information of a channel incapable of roaming by the STA is set in a Non-preferred Channel Report field. Note that WNM stands for Wireless Network Management. Upon receiving, from the STA, the information of the channel incapable of roaming, the AP can prevent including, in a roaming target BSS candidate list, a BSS that uses the channel incapable of roaming. That is, based on the channel information from the STA, the AP notifies the STA of the roaming target BSS candidate list including a BSS that uses the channel capable of roaming by the STA. In the embodiment, a printer 101 notifies an AP 102 of information of a channel incapable of roaming, so the printer 101 is not notified of a roaming destination candidate in which interference may occur to influence communication.

Figure 3:
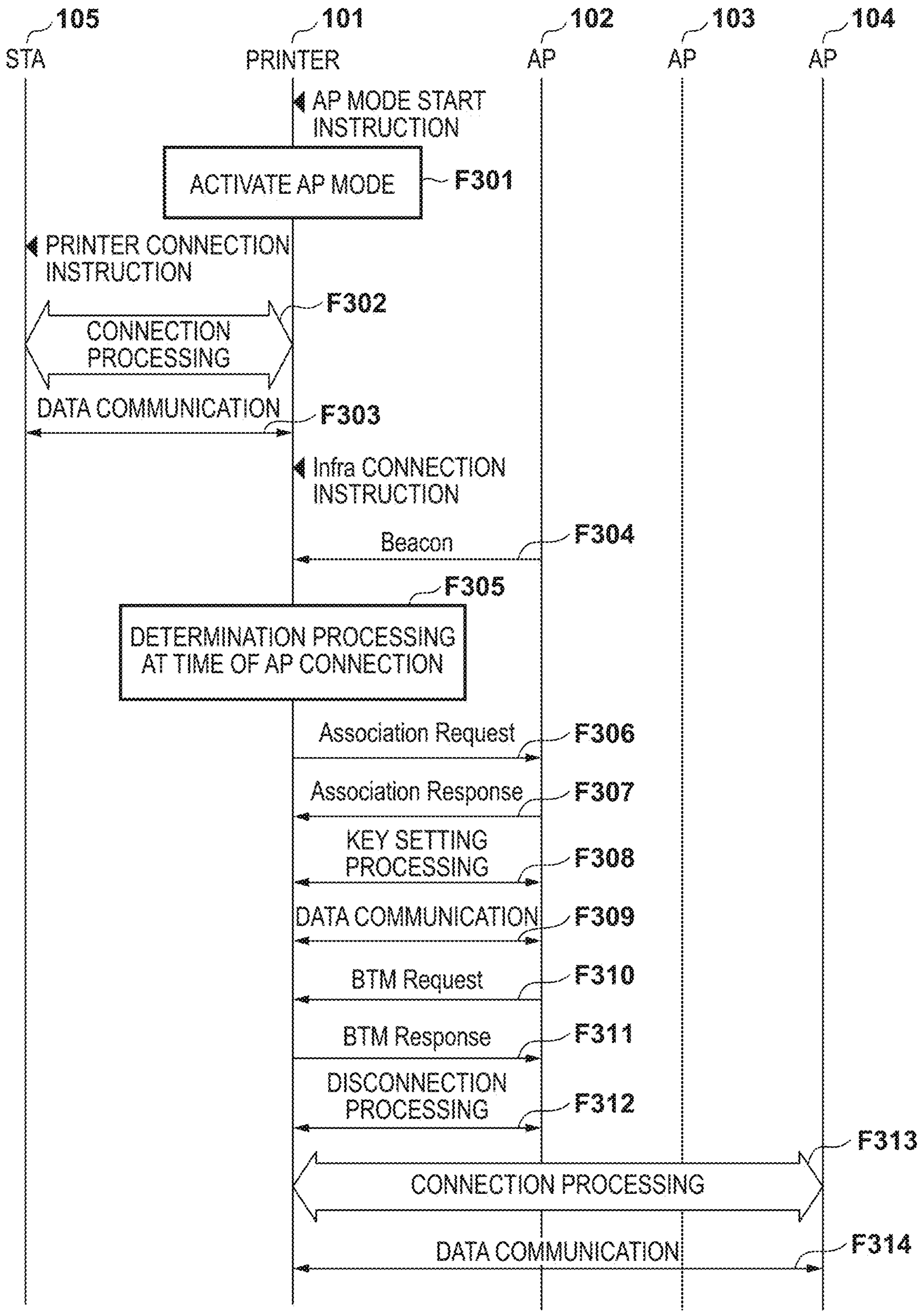
FIG. 3 is a chart showing an example of the sequence of processing executed in the communication system.

FIG. 3 shows an example of the sequence of processing executed in a system according to the embodiment. FIG. 3 shows an example of the sequence of processing when the printer 101 performs roaming to an AP 104 in accordance with an instruction from the AP 102 in a system of FIG. 1.

In the processing of FIG. 3, first, the printer 101 accepts, for example, an AP mode start instruction operation by the user and activates the AP mode (F301). Then, the printer 101 forms a network 111. Assume that 6 ch of the 2.4 GHz band is used in the network 111. After that, a STA 105 accepts, for example, an instruction of connection to the printer 101 from the user, and the printer 101 executes processing of connection to the network 111 formed in the AP mode (F302). Upon completion of the connection processing, data communication can be performed between the printer 101 and the STA 105 (F303). Here, the printer 101 accepts an infrastructure connection (to be also referred to as "Infra connection" hereinafter) instruction. In this case, the printer 101 executes processing of connection to a surrounding AP using the function of the STA mode. The printer 101 establishes a connection to the AP 102 that forms a network 112. Assume that 1 ch of the 2.4 GHz band is used in the network 112. In the STA mode, the printer 101 receives a Beacon frame from the surrounding AP. Here, the printer 101 receives a Beacon frame sent from the AP 102 (F304). The printer 101 checks MBO Capability Indication information included in the received Beacon frame. From this, the printer 101 can identify whether the AP 102 is an AP compliant with the Wi-Fi Agile Multiband standard. Here, the 102 is an AP compliant with the Wi-Fi Agile Multiband standard, and the printer 101 identifies this.

Subsequently, the printer 101 performs determination processing at the time of connection to the AP (F305). Details of the determination processing will be described later. In the determination processing, the printer 101 determines whether to transmit an Association Request frame at the time of connection to the AP, including information of a channel used in the AP mode as a Non-preferred channel. In the embodiment, the printer 101 determines to transmit an Association Request frame including information of a channel used in the AP mode. In this case, the printer 101 transmits, to the AP 102, an Association Request frame including information representing 6 ch that is a channel used in the AP mode as the Non-preferred channel (F306). Note that the printer 101 can set a BTM Capability bit in the Association Request frame and transmit it. From this, the AP 102 can identify that the printer 101 complies with the Wi-Fi Agile Multiband standard. Note that processing necessary for authentication processing of an Authentication frame or the like is executed before the Association Request frame, but a description thereof is omitted in FIG. 3.

Upon receiving the Association Request frame in F306, the AP 102 stores the set information (6 ch) as the Non-preferred channel of the printer 101. The AP 102 transmits an Association Response frame to the printer 101 (F307). Upon receiving the Association Response frame, the printer 101 performs key setting processing with the AP 102 (F308). The key setting processing is processing of setting a cryptographic key and the like used for encryption and decryption in wireless LAN communication between the printer 101 in the STA mode and the AP 102. In the key setting processing, for example, 4-Way Handshake processing and the like are executed. Upon completion of the key setting processing, data communication is performed between the printer 101 and the AP 102 (F309).

Then, assume that the AP 102 detects that the network 112 is congested owing to an increase in the traffic of the network 112 formed by the AP 102 and an increase in the number of connected STAs. For example, when the amount of allocated resources exceeds a predetermined value or the number of connected STAs exceeds a predetermined value, the AP 102 can determine that the network 112 is congested. When the AP 102 determines that the network 112 is congested, it determines whether to shift the STA connected to the AP 102 to another network capable of roaming. In the embodiment, the AP 102 determines to shift the printer 101 to another network. As described above, roaming is possible from the network 112 formed by the AP 102 to a network 113 formed by the AP 103 and a network 114 formed by the AP 104. Also, as described above, 6 ch is used in the network 113, and 11 ch is used in the network 114.

When the AP 102 decides to shift the printer 101 to another network, it selects the roaming destination network of the printer 101. The AP 102 stores in F306 that the Non-preferred Channel of the printer 101 is 6 ch. Hence, the AP 102 excludes, from roaming destination candidates of the printer 101, the network 113 that uses 6 ch. Since the network 114 uses 11 ch different from 6 ch, the AP 102 selects the network 114 as a roaming destination candidate of the printer 101. Then, the AP 102 transmits, to the printer 101, a BTM Request frame including information of the network 114 as the roaming destination candidate (F310). Although only the networks 113 and 114 are considered as roaming destinations from the network 112 in the embodiment, there may be other networks capable of roaming. In this case, the AP 102 may notify the printer 101 of, as roaming destination candidates, a plurality of networks capable of roaming that do not use 6 ch.

Upon receiving the BTM Request frame, the printer 101 determines whether to execute roaming based on information included in the frame. For example, the printer 101 can obtain, from information included in the BTM Request frame, a roaming destination candidate network and information of a frequency channel used in the network, and determine whether roaming can be executed. Here, the printer 101 specifies, from the BTM Request frame, the network 114 as a roaming destination candidate and 11 ch used in the network 114. The printer 101 can determine that mutual interference between the frequency channel (6 ch) in use in the AP mode and the channel (11 ch) used in the network 114 as the roaming destination candidate is so small as not to influence communication, and roaming can be executed. When roaming can be executed, the printer 101 may always determine to execute roaming, or decide whether to execute roaming in accordance with the radio quality of a signal of the roaming destination candidate network, or the like.

Here, the printer 101 decides to execute roaming to the network 114. In this case, the printer 101 transmits, to the AP 102, a BTM Response frame including information representing that roaming to the network 114 is executed (F311). The printer 101 cancels the connection to the AP 102 (F312). Thereafter, the printer 101 executes processing of connection to the AP 104 that provides the network 114 as the roaming destination (F313). This connection processing is similar to the processing in F304 to F308 described above. As described about F306, the printer 101 transmits, to the AP 104, an Association Request frame including a Non-preferred Channel. The printer 101 connects to the AP 104 and upon completion of roaming, performs data communication with the AP 104 (F314).

As described above, in the processing of FIG. 3, the printer 101 notifies a connection destination AP of information of a channel used in the AP mode as the Non-preferred Channel. A roaming instruction from the AP can prompt selection of a roaming destination candidate from which a network that uses the channel used by the printer 101 in the AP mode is excluded. This can prevent strong mutual interference between communication in the STA mode and communication in the AP mode when the printer 101 executes roaming in the STA mode.

Figure 4:
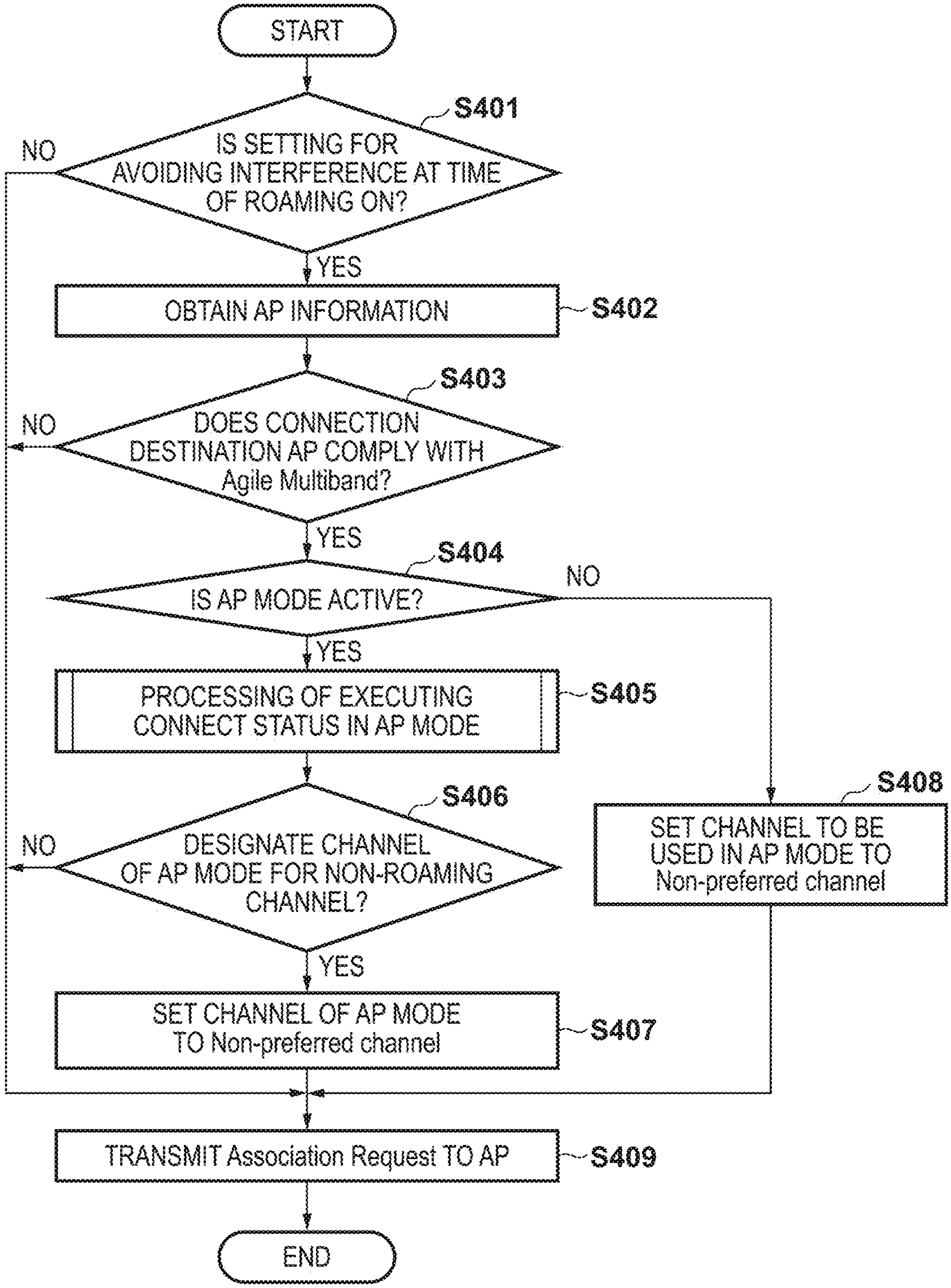
FIG. 4 is a flowchart showing an example of the sequence of processing executed by the printer.

Next, an example of the sequence of determination processing at the time of AP connection in F305 described above will be explained with reference to FIG. 4. The printer 101 can execute the processing in FIG. 4 by, for example, reading out a computer program stored in a storage unit 209 and executing it by a control unit 210. Note that this is merely an example, and hardware dedicated to execute at least part of the processing in FIG. 4 may be prepared.

When the determination processing at the time of AP connection starts, the printer 101 determines whether an interference avoidance setting for avoiding interference at the time of roaming is enabled (ON) (step S401). If the interference avoidance setting is enabled (YES in step S401), the printer 101 advances the process to step S402. If the interference avoidance setting is not enabled (NO in step S401), the printer 101 advances the process to step S409. The interference avoidance setting can be enabled or disabled by a user operation accepted via an operation unit 203. For example, when a predetermined condition is satisfied, the computer program executed by the control unit 210 may control to autonomously enable or disable the interference avoidance setting. For example, the printer 101 may be constituted to automatically enable or disable the interference avoidance setting based on the network load (congestion degree) in either or both of the STA mode and AP mode of the printer 101.

In step S402, the printer 101 obtains information of the connection destination AP. For example, as described about F304, the printer 101 can receive a Beacon frame incoming from the AP, and obtain information of the AP from the frame. In the STA mode of the printer 101, the printer 101 may transmit a Probe Request frame, receive a Probe Response frame as the response, and obtain information of the AP from the Probe Response frame. Note that the printer 101 can transmit the Probe Request frame including information associated with the Wi-Fi Agile Multiband standard. The printer 101 transmits, for example, the Probe Request frame in which a BTM Capability bit is set. The printer 101 may transmit a predetermined Action frame defined in the IEEE 802.11 series standard, receive a response frame to the frame, and obtain information of the AP. Then, based on the AP information obtained in step S402, the printer 101 determines whether the connection destination AP complies with the Wi-Fi Agile Multiband standard (step S403). If the printer 101 determines that the connection destination AP complies with the Wi-Fi Agile Multiband standard (YES in step S403), it advances the process to step S404. If the printer 101 determines that the connection destination AP does not comply with the Wi-Fi Agile Multiband standard (NO in step S403), it advances the process to step S409.

In step S404, the printer 101 determines whether the AP mode is active. If the AP mode is active (YES in step S404), the printer 101 advances the process to step S405. If the AP mode is inactive (NO in step S404), the printer 101 advances the process to step S408.

In step S405, the printer 101 executes processing of executing a connect status in the AP mode. This processing will be explained with reference to FIG. 5.

Figure 5:
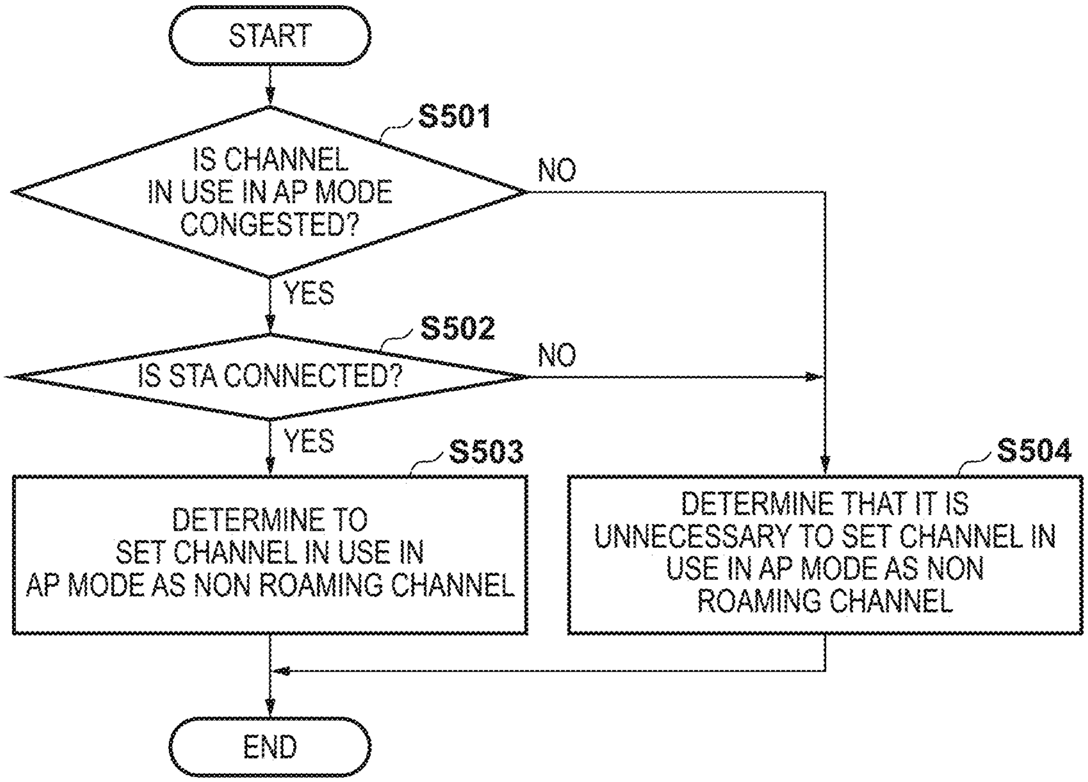
FIG. 5 is a flowchart showing an example of the sequence of processing executed by the printer.

In FIG. 5, the printer 101 determines whether the channel in use in the AP mode is congested (step S501). For example, if the value of the signal to noise ratio (SNR) of a received signal is equal to or larger than a predetermined value, the printer 101 can determine that the channel in use in the AP mode is congested, and if the SNR value is smaller than the predetermined value, determine that the channel is not congested. Note that this is merely an example, and the congestion state may be determined by another criterion. For example, another criterion may be used such that if the time until transmission of a predetermined amount of data is completed after the start is equal to or longer than a predetermined duration, it is determined that the channel is congested. If the printer 101 determines that the channel in use in the AP mode is congested (YES in step S501), it advances the process to step S502. If the printer 101 determines that the channel in use in the AP mode is not congested (NO in step S501), it advances the process to step S504. In step S502, the printer 101 determines whether the STA is connected to the network 111 formed in the AP mode. That is, the printer 101 determines whether a communication partner apparatus exists in the AP mode. If the STA is connected to the network 111 (YES in step S502), the printer 101 advances the process to step S503. If no STA is connected to the network 111 (NO in step S502), the printer 101 advances the process to step S504.

In step S503, the printer 101 sets the channel in use in the AP mode as a channel incapable of roaming in the STA mode. That is, the printer 101 sets the channel in use in the AP mode as the Non-preferred Channel. The processing in step S503 is performed when the channel in use in the AP mode is congested and the STA is connected. In this case, if the same channel as that in the AP mode is used by roaming in the STA mode, the influence of interference is predicted to be great. In step S503, therefore, the channel in use in the AP mode is set as the Non-preferred Channel to restrict roaming destinations in the STA mode. In contrast, the processing in step S504 is performed when the channel in use in the AP mode is not congested or no STA is connected.

In this case, even if the same channel as that in the AP mode is used by roaming in the STA mode, the influence of interference is predicted to be small. Hence, the printer 101 can determine in step S504 that it is unnecessary to set the channel in use in the AP mode as a channel incapable of roaming in the STA mode. The printer 101 does not include the channel in use in the AP mode in the Non-preferred Channel.

Note that the example in FIG. 5 is merely an example, and it may be decided by processing different from that in FIG. 5 whether to include, in the Non-preferred Channel, the channel in use in the AP mode. For example, whether to include, in the Non-preferred Channel, the channel in use in the AP mode may be decided in accordance with only whether a connected STA exists, without performing the processing in step S501. In an example, the processing in step S502 may be omitted. Alternatively, when the AP mode is active, the printer 101 may always include, in the Non-preferred Channel, the channel in use in the AP mode without executing the determination processing.

Referring back to FIG. 4, after the determination processing in step S405, the printer 101 determines based on the determination result in step S405 whether to include, in the Non-preferred Channel, the channel in use in the AP mode (step S406). If the channel in use in the AP mode is included in the Non-preferred Channel (YES in step S406), the printer 101 advances the process to step S407. If the channel in use in the AP mode is not included in the Non-preferred Channel (NO in step S406), the printer 101 advances the process to step S409.

In step S407, the printer 101 sets, to the Non-preferred Channel, the channel in use in the AP mode. Of channels different from the channel in use in the AP mode, a channel that may be used differently in the AP mode is sometimes determined in advance. In this case, the printer 101 may set even this channel to the Non-preferred Channel. Then, the printer 101 advances the process to step S409.

Step S408 is processing when the printer 101 does not activate the AP mode. In this case, if there is a channel to be used when the AP mode is activated, the printer 101 sets the channel to the Non-preferred Channel. When there are a plurality of channels to be used in the AP mode, the printer 101 may set these channels to the Non-preferred Channel. Alternatively, when there are a plurality of channels to be used in the AP mode, the printer 101 may set not all but only some (for example, one) of the channels as the Non-preferred Channel. When the AP mode is not activated, the printer 101 need not do anything. In this case, for example, when the AP mode is activated, the printer 101 can activate the AP mode using a channel different from the channel used in the network connected in the STA mode. After that, the printer 101 advances the process to step S409.

In step S409, the printer 101 transmits an Association Request frame to the AP connected in the STA mode. When there is Non-preferred Channel information, the Association Request frame including the Non-preferred Channel information and information about the Wi-Fi Agile Multiband standard is transmitted.

As described above, according to the embodiment, the printer 101 can notify a connection destination AP in advance of information representing a channel in use in the AP mode as information of a channel that should be excluded from roaming destination candidates. The AP can exclude a network that uses the notified channel, from roaming destination candidates in a roaming instruction. The printer 101 can receive the roaming instruction in which the network that uses the channel used in the AP mode is excluded from roaming destination candidates. As a result, the printer 101 can prevent using the same channel in the STA mode and the AP after roaming in the STA mode. In other words, strong mutual interference between communication in the STA mode and communication in the AP mode can be prevented after roaming in the STA mode.

In the embodiment, an example in which each determination processing is performed restrictively on a channel in use in the AP mode has been explained. However, the present invention is not limited to this. For example, each determination processing may be performed based on not only a channel in use in the AP mode but also a surrounding channel such as a channel adjacent to the channel. For example, interference readily occurs between adjacent channels in the 2.4 GHz band. As for all surrounding channels predicted to generate strong mutual interference, these channels may be included in the Non-preferred Channel so as to exclude, from roaming targets, networks that use the channels. Note that the AP 102 may be notified of only a channel used in the AP mode and determine to exclude, from roaming targets, networks that use surrounding channels predicted to generate strong mutual interference with the notified channel. When the printer 101 complies with a plurality of frequency bands such as 2.4 GHz/5 GHz/6 GHz, the printer 101 may include, in the Non-preferred Channel, all channels of a frequency band including a channel used in the AP mode. This can suppress generation of roaming in the STA mode to the frequency band to which the channel in use in the AP mode belongs, and more reliably prevent generation of interference between the two modes.

In the above-described embodiment, the printer 101 determines whether to include, in an Association Request frame, information of a channel in use in the AP mode when connecting to an AP in the STA mode. However, the present invention is not limited to this. For example, in a state in which the printer 101 is connected to an AP, the printer 101 may notify the connection destination AP of Non-preferred Channel information. For example, after establishing connection to the AP, the printer 101 may transmit, to the AP, a WNM-Notification Request frame including the Non-preferred Channel. For example, after activating the AP mode, the printer 101 can transmit a WNM-Notification Request frame to an AP. Alternatively, before activating the AP mode, the printer 101 may transmit the frame to an AP. For example, the printer 101 can transmit the frame when the AP mode is activated after it connects to an AP in the STA mode, or when the AP mode is reactivated using another channel during connection to an AP in the STA mode.

Second Embodiment

In the first embodiment described above, the printer 101 notifies the AP 102 connected in the STA mode of information representing a channel used in the AP mode, and the AP 102 excludes, from roaming destination candidates, a network that uses the channel. In the second embodiment, processing of preventing mutual interference between communication in the AP mode and communication in the STA mode by roaming in a printer 101 when the printer 101 does not notify an AP 102 of information representing a channel used in the AP mode will be explained.

Figure 6:
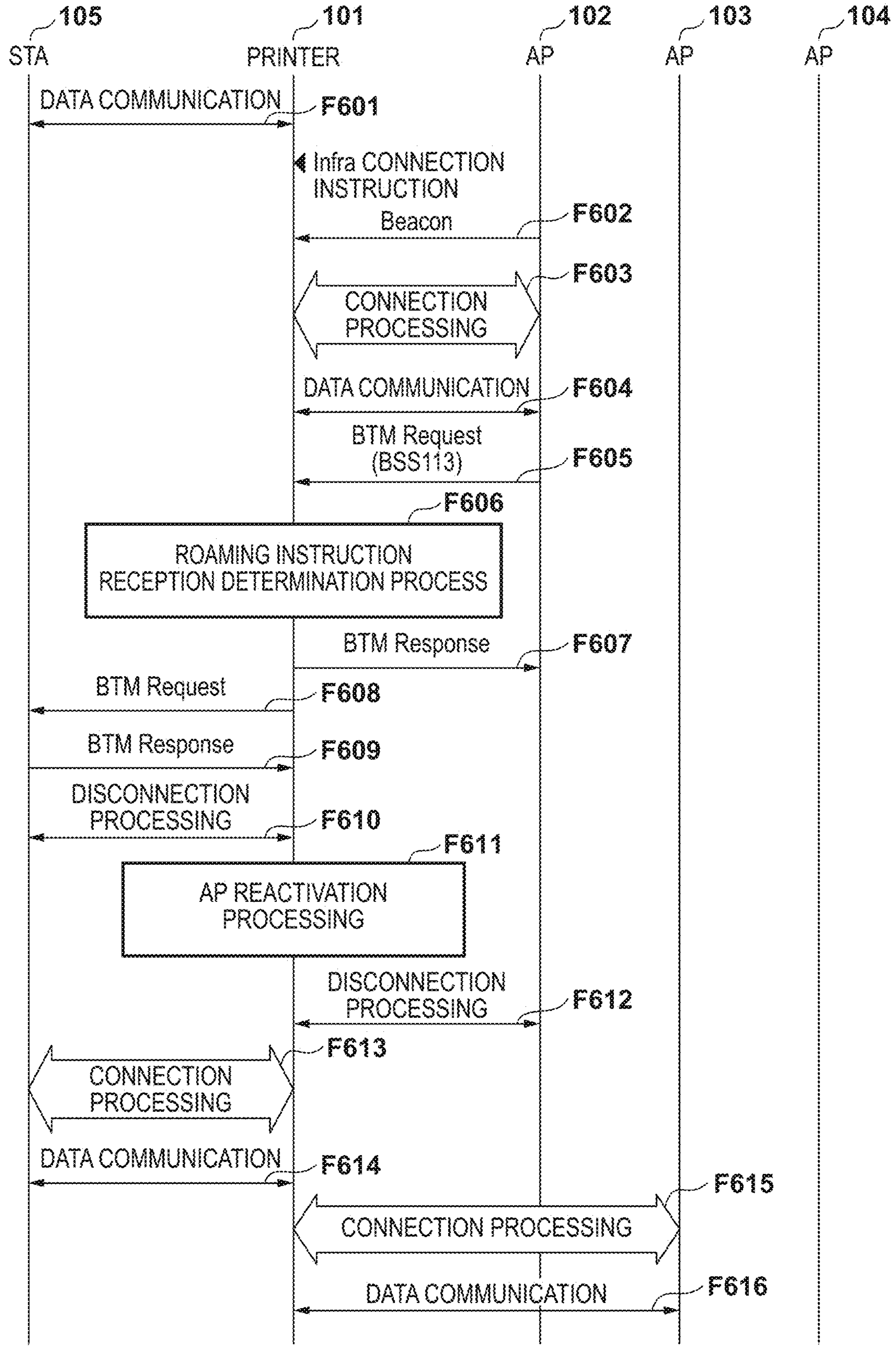
FIG. 6 is a chart showing another example of the sequence of processing executed in the communication system.

FIG. 6 shows an example of the sequence of processing executed in a system according to the embodiment. In FIG. 6, assume that in the system of FIG. 1, the printer 101 activates the AP mode and forms a network 111, a STA 105 connects to the network 111, and data communication is performed between the printer 101 and the STA 105 (F601).

When the printer 101 accepts an Infra connection instruction in this state, it searches for a surrounding AP for connection in the STA mode. The printer 101 receives a Beacon frame from the AP 102 (F602), and executes connection processing with the AP 102 based on the Beacon frame (F603). Note that the Beacon frame includes information described in the first embodiment. Note that, in the second embodiment, the printer 101 transmits an Association Request frame at the time of connection to the AP without including information of a channel used in the AP mode as a Non-preferred channel. In an example, when the interference avoidance setting at the time of roaming as described in step S401 is disabled, the printer 101 transmits such an Association Request frame. However, this is merely an example, and the Association Request frame including no information of a channel used in the AP mode may be transmitted as the Non-preferred channel for another reason. Note that the connection processing in F603 is similar to the processing described with reference to F306 to F308 in the first embodiment except that the Association Request frame does not include information of a channel used in the AP mode. After establishing connection to the AP 102, the printer 101 performs data communication with the AP 102 (F604).

Then, assume that the AP 102 detects that a network 112 formed by the AP 102 is congested, and decides to shift the connected STA to another network. Note that the detection of the congestion can be performed by the method described in the first embodiment. Here, the AP 102 decides to shift the printer 101 to another network in accordance with detection of the congestion of the network 112. As described above, a network 113 formed by an AP 103 and a network 114 formed by an AP 104 exist as roaming destination candidates from the network 112. Assume that the AP 102 selects the network 113 formed by the AP 103 out of these networks. This selection can be performed based on, for example, information of the congestion degrees of the networks 113 and 114. For example, when the network 114 is congested, the AP 102 can exclude the network 114 from roaming destination candidates and select the network 113 as a roaming destination candidate. In accordance with this selection, the AP 102 transmits a BTM Request frame including information of the network 113 to the printer 101 (F605). Note that the BTM Request frame may be used to notify the printer 101 of only information capable of specifying a network, such as the BSSID of the network 113, or notify the printer 101 together with information of a channel used in the network. When the AP 102 notifies the printer 101 of only the BSSIDs of roaming candidate networks, the printer 101 needs to separately specify a channel used in each network. The printer 101 can specify a channel used in a roaming candidate network by, for example, receiving a Beacon frame or the like in each of usable frequency channels. The printer 101 may separately receive, from the AP 102 or the like, information representing a channel used in a roaming candidate network.

Upon receiving the BTM Request frame, the printer 101 executes roaming instruction reception determination processing based on information included in the frame (F606). In this case, the roaming destination candidate is only the network 113 that uses the same channel as the channel (6 ch) used in the AP mode of the printer 101. To execute roaming to the network 113, the printer 101 can decide to change the channel used in the AP mode. Note that details of the roaming instruction reception determination processing will be described later.

The printer 101 transmits, to the AP 102, a BTM Response frame including information representing that roaming is executed, and information of the network 113 as a roaming destination (F607). Then, the printer 101 executes processing for changing the channel used in the AP mode. In this processing, the printer 101 performs processing of changing the channel used and reactivating the AP mode. That is, the printer 101 executes AP mode reactivation processing so as to use, in the AP mode, a channel different from the channel used in the roaming destination network. When the STA 105 connected to the network 111 complies with the Wi-Fi Agile Multiband standard, the printer 101 performs roaming of the STA 105 to a network formed in the AP mode after reactivation. For this processing, first, the printer 101 transmits a BTM Request message to the STA 105 (F608). The BTM Request message can include information of the AP mode after reactivation, and information of the time until roaming starts. The information of the time until roaming starts can be specified based on, for example, the time necessary to reactivate the AP mode in the printer 101. Upon receiving the BTM Request message from the printer 101, the STA 105 determines whether roaming can be executed, and transmits a BTM Response message to the printer 101 (F609). Assume that the STA 105 determines that roaming can be executed, and transmits, to the printer 101, a BTM Response message including information representing that roaming is executed. The printer 101 and the STA 105 perform disconnection processing of the STA 105 from the network 111 (F610). Thereafter, the printer 101 executes AP mode reactivation processing to change the channel used in the AP mode from the currently used channel (F611). Assume that the printer 101 changes the channel used from 6 ch to 8 ch.

After the AP mode is reactivated, the printer 101 cancels the connection to the AP 102 in the STA mode (F612). Subsequently, the printer 101 executes processing for establishing again connection to the STA 105 in the AP mode based on the information of a BTM Request frame and BTM Response frame transmitted/received in advance (F613). In the AP mode, the printer 101 performs data communication with the STA 105 upon completion of the connection processing (F614). In the STA mode, the printer 101 performs connection processing with the AP 103 serving as a roaming destination based on information of a BTM Request frame from the AP 102 (F615). This connection processing is similar to the processing in F603 described above. In the STA mode, the printer 101 executes data communication with the AP 103 (F616).

Figure 7:
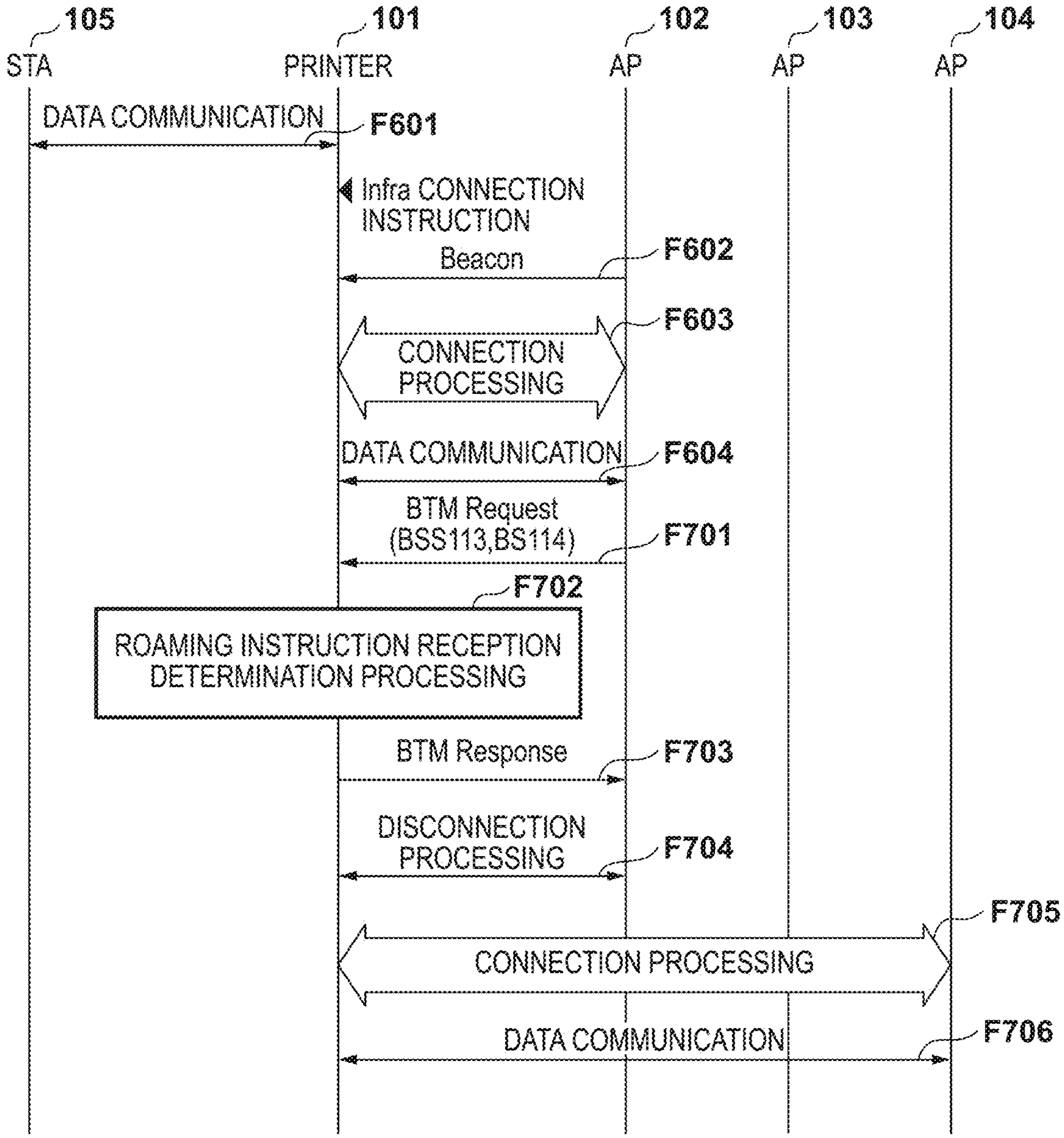
FIG. 7 is a chart showing still another example of the sequence of processing executed in the communication system.

In the above-described example, only the BSS (network 113) formed by the AP 103 is included in the BSS candidate list in the BTM Request frame from the AP 102 in F605. The network 113 uses 6 ch that is the same as the channel used in the AP mode in the printer 101. Thus, the printer 101 performs processing of changing the channel used in the AP mode for roaming to the network 113 in the STA mode. However, both the BSSs (networks 113 and 114) respectively formed by the APs 103 and 104 may be included in the BTM Request frame from the AP 102. The channel used in the network 114 is different from the channel in use in the AP mode in the printer 101. If the printer 101 decides to perform roaming to the network 114 in the STA mode, it need not change the channel used in the AP mode. FIG. 7 shows an example of this processing. In FIG. 7, the same reference numerals denote processes similar to those in FIG. 6, and a description thereof will not be repeated.

In the example of FIG. 7, assume that the AP 102 selects both the network 113 formed by the AP 103 and the network 114 formed by the AP 104 as roaming destination candidates. In this case, the AP 102 transmits, to the printer 101, a BTM Request frame including information of both the networks 113 and 114 in accordance with this selection (F701). Upon receiving the BTM Request frame, the printer 101 executes roaming instruction reception determination processing based on information included in the frame (F702). In this case, the roaming destination candidates include the network 114 that uses a channel different from the channel (6 ch) used in the AP mode of the printer 101. Thus, the printer 101 decides to execute roaming to the network 114. The printer 101 transmits, to the AP 102, a BTM Response frame including information representing that roaming to the network 114 is executed (F703). The printer 101 cancels the connection to the AP 102 (F704). Thereafter, the printer 101 executes processing of connection to the AP 104 that provides the network 114 as the roaming destination (F705). The printer 101 connects to the AP 104 and upon completion of roaming, performs data communication with the AP 104 (F706). Note that the processing in F703 to F706 is similar to that in F311 to F314 of FIG. 3.

Figure 8:
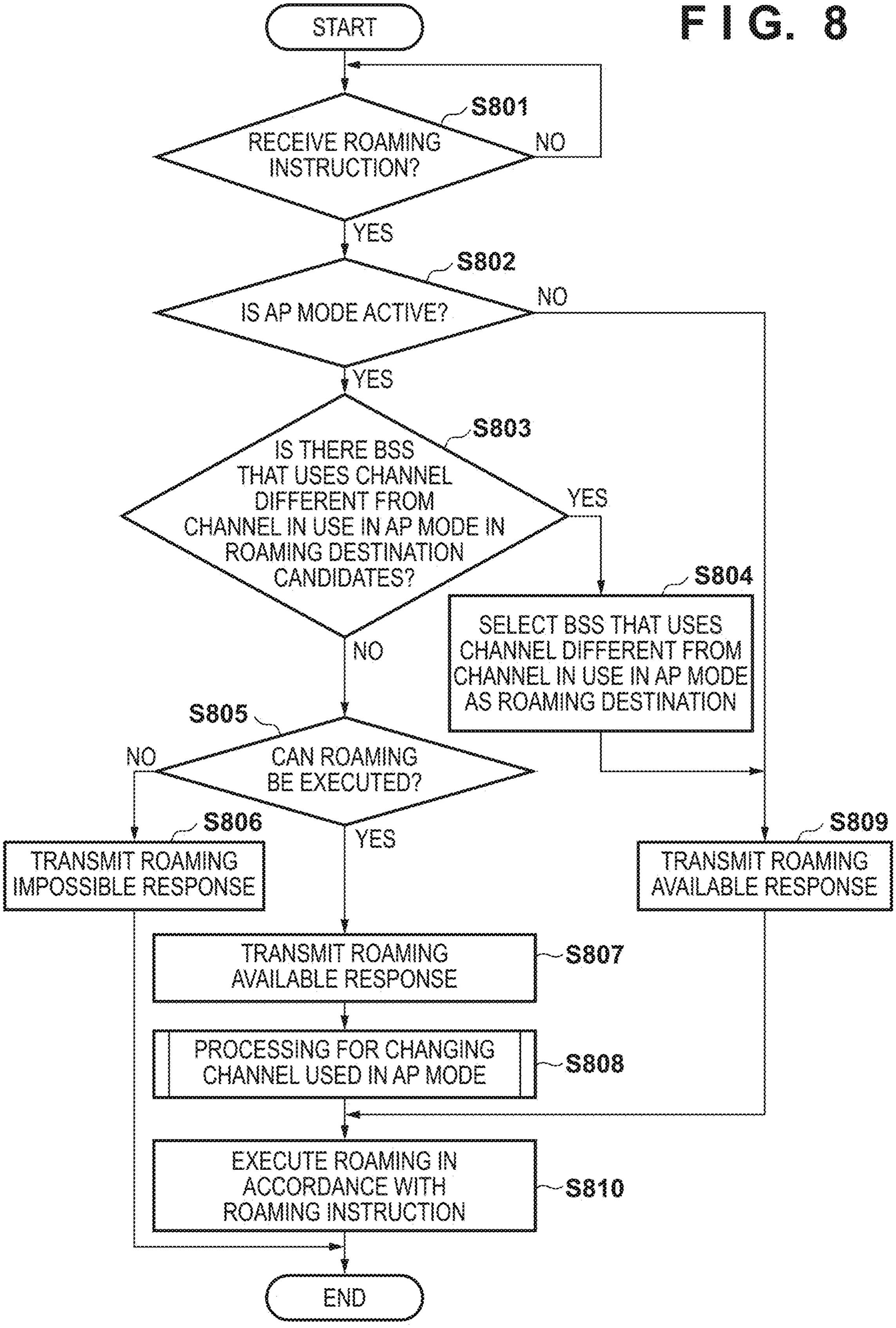
FIG. 8 is a flowchart showing an example of the sequence of processing executed by a printer 101.

Next, an example of the sequence of roaming instruction reception determination processing executed in the printer 101 in F606 and F702 described above will be explained with reference to FIG. 8. The printer 101 can execute the processing in FIG. 8 by, for example, reading out a computer program stored in a storage unit 209 and executing it by a control unit 210. Note that this is merely an example, and hardware dedicated to execute at least part of the processing in FIG. 8 may be prepared.

If the printer 101 receives a roaming instruction from a connected AP (YES in step S801), it determines whether the AP mode is active (step S802). Although a BTM Request frame is used as the roaming instruction from the AP, another frame may be used. If the AP mode is active (YES in step S802), the printer 101 advances the process to step S803. If the AP mode is inactive (NO in step S802), the printer 101 advances the process to step S809. In step S809, the printer 101 transmits, to the AP, a BTM Response frame including information representing that roaming is executed.

In step S803, the printer 101 checks a roaming destination BSS candidate list included in the BTM Request frame, and determines whether the candidates include a BSS that uses a channel different from the channel in use in the AP mode. Note that the printer 101 is notified of the roaming destination BSS candidate list by using, for example, a BSS Transition Candidate List included in the BTM Request frame. If the candidates include a BSS that uses a channel different from the channel in use in the AP mode (YES in step S803), the printer 101 advances the process to step S804. If the candidates do not include a BSS that uses a channel different from the channel in use in the AP mode (NO in step S803), the printer 101 advances the process to step S805. When the candidates include only a BSS that uses a channel predicted to strongly interfere with communication in the AP mode, such as a channel adjacent to the channel in use in the AP mode, the printer 101 can advance the process to step S805.

In step S804, the printer 101 selects, as a roaming destination, the BSS that uses a channel different from the channel in use in the AP mode. In step S809, the printer 101 transmits, to the AP, a BTM Response frame including information representing that roaming is executed. Then, the printer 101 executes roaming in accordance with a roaming instruction by the BTM Request frame from the AP (step S810).

In step S805, the printer 101 determines whether roaming can be executed. The printer 101 can select, as a roaming destination candidate, only a BSS that uses the same channel as the channel used in the AP mode. Thus, for example, when reactivation of the AP mode cannot be executed, the printer 101 determines that roaming cannot be executed (NO in step S805). In a situation, for example, during print processing, in which intermittence of data communication by reactivation of the AP mode is not permitted between the printer 101 and the STA connected using the AP mode, the printer 101 can determine that the AP mode cannot be reactivated and roaming cannot be executed. For example, the printer 101 may accept, via a user interface, a user setting of whether to permit the use of the same channel in the AP mode and the STA mode. When the candidates include only a BSS that uses the same channel as the channel in use in the AP mode, and the use of the same channel between the AP mode and the STA mode is not permitted, the printer 101 can determine that roaming cannot be executed. If the printer 101 determines that roaming cannot be executed (NO in step S805), it advances the process to step S806. If the printer 101 determines that roaming can be executed (YES in step S805), it advances the process to step S807.

In step S806, the printer 101 transmits, to the AP, a BTM Response frame including information representing that roaming is not executed. In step S807, the printer 101 transmits, to the AP, a BTM Response frame including information representing that roaming is executed, and then executes processing for changing the channel used in the AP mode (step S808). Note that the processing for changing the channel used in the AP mode will be described later. After the change of the channel used in the AP mode, the printer 101 executes roaming in accordance with the roaming instruction (step S810).

In FIG. 6, an example in which the BSS candidate list in the BTM Request frame from the AP 102 includes only the BSS (network 113) formed by the AP 103 has been explained. The network 113 uses 6 ch that is the same as the channel used in the AP mode in the printer 101. In this case, the printer 101 determines that the candidates do not include a BSS that uses a channel different from the channel in use in the AP mode (NO in step S803). If the printer 101 determines to execute roaming (YES in step S805), it changes the channel used in the AP mode (step S808), and executes roaming in the STA mode (step S810). In FIG. 7, the BTM Request frame from the AP 102 includes both the BSSs (networks 113 and 114) respectively formed by the APs 103 and 104. The network 114 uses 11 ch that is different from the channel used in the AP mode in the printer 101. In this case, the printer 101 determines that the candidates include a BSS that uses a channel different from the channel in use in the AP mode (YES in step S803). In this case, the printer 101 selects the network 114 as a roaming destination (step S804), and executes roaming (step S810).

In the above-described example, a method of deciding a roaming destination network based on only whether a channel used in the AP mode and a channel used in a roaming destination candidate are the same has been explained. However, this is merely an example, and the roaming destination network selection method is not limited to this. For example, priority information may be included in a BTM Request frame, and a roaming destination network may be selected based on the priority information or the communication status. For example, the printer 101 may determine, in order from a BSS of higher priority in the BSS candidate list, whether the same channel as that in the AP mode is used, and determine whether to select the BSS as a roaming destination. Note that the roaming capability/incapability determination criterion in accordance with the communication statuses in the AP mode and the STA mode may be changed depending on the priority. In an example, when the priority is the first value, it can be determined that roaming is possible if the channel used in the AP mode can be changed. In contrast, when the priority is the second value smaller than the first value, it can be determined that roaming is impossible if the channel used in the AP mode needs to be changed. Also, when the priority is the first value, it can be determined that roaming is possible even if the channel used in the AP mode cannot be changed quickly. When the priority is the second value, it can be determined that roaming is possible on condition that the channel used in the AP mode is changed quickly.

Figure 9:
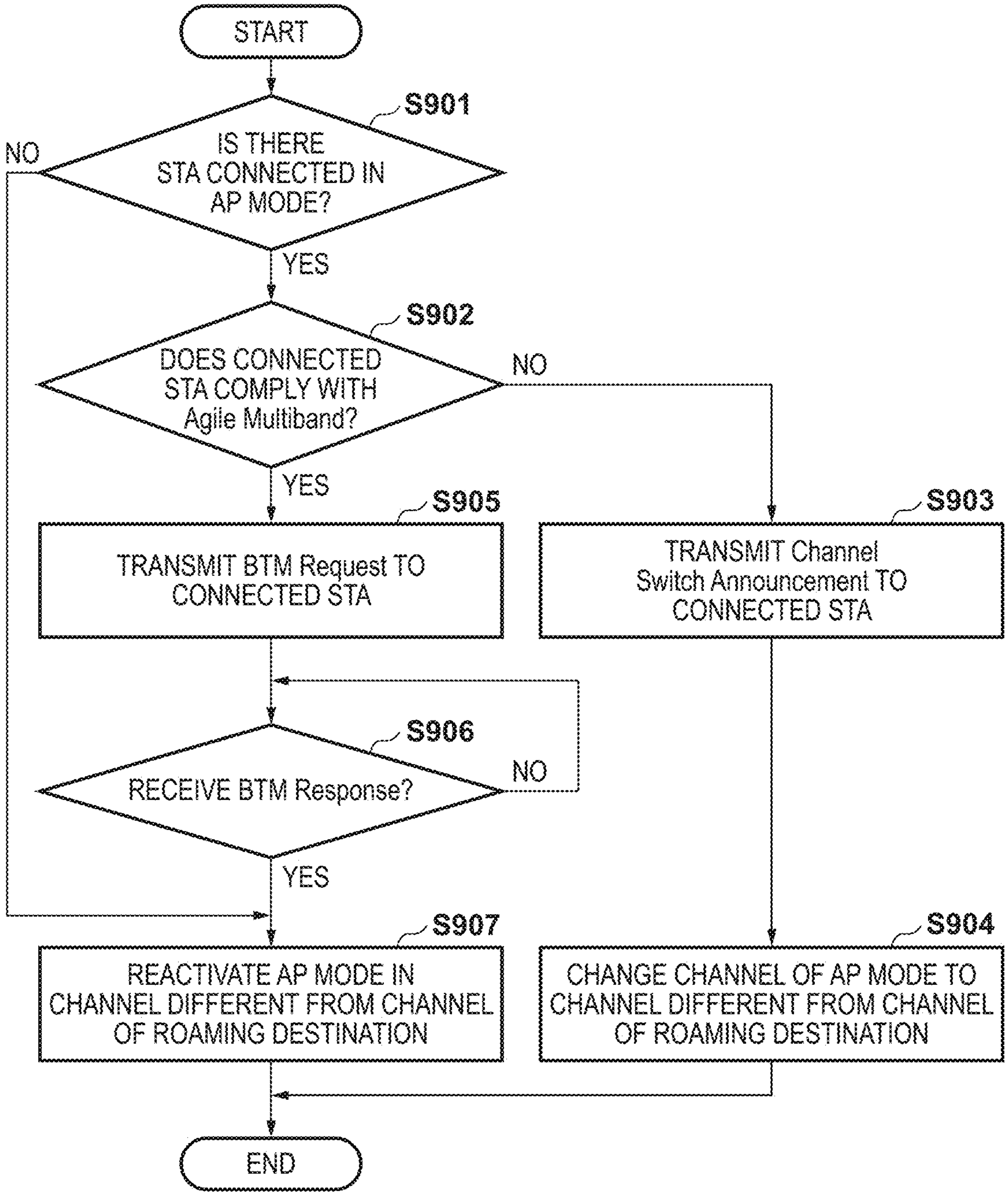
FIG. 9 is a flowchart showing an example of the sequence of processing executed by the printer 101.

Subsequently, an example of the sequence of processing for changing a channel used in the AP mode that is executed in step S808 will be explained with reference to FIG. 9. First, the printer 101 determines whether there is a STA connected to the network 111 formed in the AP mode (step S901). If there is a STA connected to the network 111 (YES in step S901), the printer 101 advances the process to step S902. If there is no STA connected to the network 111 (NO in step S901), the printer 101 advances the process to step S907. In step S902, the printer 101 determines whether the connected STA complies with the Wi-Fi Agile Multiband standard. The printer 101 can make this determination based on, for example, information of the included in the Association Request frame or Probe Request frame received at the time of connection processing with the STA. For example, when either of these frames includes information representing compliance with the Wi-Fi Agile Multiband standard, the printer 101 can determine that the STA complies with the Wi-Fi Agile Multiband standard. If the printer 101 determines that the connected STA does not comply with the Wi-Fi Agile Multiband standard (NO in step S902), it advances the process to step S903. If the printer 101 determines that the connected STA complies with the Wi-Fi Agile Multiband standard (YES in step S902), it advances the process to step S905.

In step S903, the connected STA does not comply with the Wi-Fi Agile Multiband standard, so the printer 101 needs to change the channel used in the AP mode by another method. In the embodiment, the printer 101 transmits, to the STA, a Channel Switch Announcement frame including information of a channel after change, and notifies the STA of the change of the channel used (step S903). However, this is merely an example, and the channel used in the AP mode may be changed by another method. When the Channel Switch Announcement frame is used, the AP mode need not be reactivated. Then, the printer 101 changes the setting to use, in the AP mode, a channel different from a channel used in a roaming destination network in the STA mode (step S904). At this time, the printer 101 can select, as a channel used in the AP mode, a channel different from channels in a connected network and a roaming destination network in the STA mode. Alternatively, the printer 101 may select a channel different from a channel used in a BSS included in a BSS candidate list included in a BTM Request frame received from a connection destination AP in the STA mode. Accordingly, the printer 101 can reduce the possibility at which the channel used in the AP mode becomes the same as a channel that may be subjected to roaming in the STA mode.

In step S905, the printer 101 transmits, to a STA compliant with the Wi-Fi Agile Multiband standard, a BTM Request frame including an instruction of roaming to a network formed in the AP mode after reactivation. The transmitted BTM Request includes information about a network constituted in the AP mode after reactivation. The information includes information of a channel used in the network, and the like. In this case, the printer 101 may change the BSSID to the second BSSID different from the current first BSSID and reactivate the AP mode, and the BTM Request frame may include the second BSSID after reactivation. In consideration of the reactivation time of the AP mode, the BTM Request frame may include information of the time until connection processing by roaming can be started. When the STA receives the BTM Request frame, it executes roaming based on the information of the time until connection processing by roaming can be started, which is included in the frame. The connection processing by roaming of the STA is started in accordance with the time necessary to reactivate the AP mode in the printer 101. This can shorten the period in which the printer 101 is disconnected from the STA in the AP mode.

After transmitting the BTM Request frame, the printer 101 waits for the arrival of a BTM Response frame from the STA at the destination of the BTM Request frame (step S906). If the printer 101 receives the BTM Response frame (YES in step S906), it advances the process to step S907. When the printer 101 receives a BTM Response frame including information representing that the STA cannot execute roaming, it can determine in, for example, step S805 that roaming cannot be executed. Note that, in this case, the printer 101 may execute processing in step S807 after executing processing in step S808. Even when the printer 101 receives a BTM Response frame including information representing that the STA cannot execute roaming, it may forcibly reactivate the AP mode.

In step S907, the printer 101 reactivates the AP mode in a channel different from the channel used in the roaming destination network in the STA mode. Note that the printer 101 can decide a channel used in the AP mode after reactivation by using a criterion similar to the criterion described in regard to step S904.

As described above, when a network that uses a channel different from a channel used in the AP mode exists as a roaming destination candidate in the STA mode, the printer 101 decides the network as a roaming destination. When a channel at a roaming destination in the STA mode is the same as a channel used in the AP mode, the printer 101 can change the channel used in the AP mode to another channel. This can prevent using the same channel in the AP mode and the STA mode after executing roaming in the STA mode. Therefore, mutual interference between communication in the AP mode and communication in the STA mode owing to roaming can be prevented. In the above-described example, processing of changing a channel used in the AP mode when a channel at a roaming destination in the STA mode coincides with the channel used in the AP mode has been explained. However, the present invention is not limited to this. For example, even if a channel at a roaming destination in the STA mode does not coincide with a channel used in the AP mode, but if these channels have a mutual interference relationship, the channel used in the AP mode may be changed. For example, when the channel at the roaming destination in the STA mode is a peripheral channel such as a channel adjacent to the channel used in the AP mode, the channel used in the AP mode may be changed. Similarly, the printer 101 can select, as a roaming destination candidate in the STA mode, a network that uses a channel having no mutual interference relationship with a channel used in the AP mode.

In this specification and the scope of claims, "mutual interference relationship" means a relationship in which the interference level when signals of predetermined power are communicated exceeds a predetermined value. For example, when the power value of a component leaking to the second channel out of a signal of the first channel among a plurality of channels attenuates by a predetermined amount or more in comparison with the peak power in the first channel, it can be specified that these channels have a relationship in which they do not interfere with each other. That is, when a signal transmitted in the first channel sufficiently attenuates within the frequency range of the second channel and the influence becomes satisfactorily small, it can be specified that these channels have a relationship in which they do not interfere with each other. To the contrary, when the attenuation amount of power of a signal component leaking to the second channel from the peak power in the first channel becomes smaller than the predetermined amount and large power leaks to the second channel, it can be specified that these channels have a relationship in which they interfere with each other. This relationship can be specified in advance by, for example, theoretical calculation.

In the above-described two embodiments, the printer 101 operates as both a STA and an AP. Here, the AP can be rewritten into Wi-Fi Direct® Group Owner (GO). When the printer 101 operates not in the AP mode but in the second STA mode, that is, when the printer 101 joins a plurality of networks as a STA, the above-described processing can be applied. The second STA mode may be a mode in which the printer 101 operates as a Wi-Fi Direct P2P Client. More generically, the above-described processing can be executed when a communication apparatus connectable to a plurality of networks should perform roaming from the first network to the second network among the plurality of networks.

More specifically, in the first embodiment, a communication apparatus can notify another communication apparatus having a function of issuing an instruction of roaming from the first wireless network to the second network, of information of a frequency channel used in the third network among a plurality of networks. Note that, when a plurality of third networks exist, the communication apparatus can notify the other communication apparatus of information of a frequency channel used in each of the third networks. The respective third networks may be prioritized, and the communication apparatus can notify the other communication apparatus of information of a frequency channel used in each of a predetermined number of networks in descending order of priority among the third networks. That is, the communication apparatus may notify the other communication apparatus of all frequency channels used in the respective third networks, or notify the other communication apparatus of only some of the frequency channels. When the communication apparatus receives a roaming instruction based on the notification from the other communication apparatus, it can execute roaming based on the instruction. Note that the other communication apparatus can generally be a base station (AP) of the first network, but may be a control apparatus other than the base station. For example, a control apparatus that adjusts the load of the whole network may be prepared, and can instruct the communication apparatus to perform roaming of connection with a network to connection with another network via an arbitrary network to which the communication apparatus connects.

In the second embodiment, when a communication apparatus receives, from another communication apparatus, an instruction of roaming from the first network to the second network, it determines whether the second network and the third network among a plurality of networks use the same frequency. When the first frequency channel used in the second network and the second frequency channel used in the third channel coincide with each other, the communication apparatus changes the frequency channel used in the third network to the third frequency channel. Note that when the first frequency channel and the second frequency channel have the above-described mutual interference relationship, the communication apparatus may change the second frequency channel to the third frequency channel. Note that the communication apparatus can receive one or more second networks as roaming destination candidates. When there is a roaming destination candidate network that uses a frequency channel having no mutual interference relationship with the second frequency channel, the communication apparatus can perform roaming to the candidate network. Note that the communication apparatus may receive, in a roaming instruction, information of the frequency channel used in the second network, or obtain it separately from the roaming instruction.

As described above, the procedures described in the two embodiments can be applied to an arbitrary communication apparatus capable of connecting to a plurality of networks. That is, the communication apparatus need not always comply with the IEEE 802.11 series standard and can suppress generation of interference with another network along with roaming of one network by using the above-described procedures.

According to the present invention, generation of interference between networks owing to shift from one network to another can be suppressed in a communication apparatus that performs communications in a plurality of networks.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-108514, filed Jun. 30, 2023 which is hereby incorporated by reference herein in its entirety.

What is claimed is:

1. A communication apparatus comprising:

a communication unit configured to perform wireless communication;

a determination unit configured to, in a case where an instruction of roaming from a first network to a second network is received from another communication apparatus after connecting to the first network, determine whether a first frequency channel used in the second network, and a second frequency channel used in a third network in which the communication apparatus can perform communication concurrently with the first network have a mutual interference relationship;

a change unit configured to change, based on a fact that the first frequency channel and the second frequency channel have the mutual interference relationship, a frequency channel used in the third network to a third frequency channel having no mutual interference relationship with the first frequency channel; and an execution unit configured to execute roaming based on the instruction of roaming.

2. The apparatus according to claim 1, wherein the instruction of roaming includes one or more of the second networks as a roaming destination candidate, and in a case where the one or more of the second networks include a fourth network in which the first frequency channel used in the fourth network does not have the mutual interference relationship with the second frequency channel, the execution unit executes roaming from the first network to the fourth network.

3. The apparatus according to claim 2, wherein in a case where the one or more of the second networks do not include a network in which the first frequency channel does not have the mutual interference relationship with the second frequency channel, the change unit changes the frequency channel used in the third network to the third frequency channel.

4. The apparatus according to claim 1, wherein in a case where the first frequency channel and the second frequency channel coincide with each other, the determination unit determines that the first frequency channel and the second frequency channel have the mutual interference relationship.

5. The apparatus according to claim 1, wherein in a case where the first frequency channel is a channel adjacent to the second frequency channel, the determination unit determines that the first frequency channel and the second frequency channel have the mutual interference relationship.

6. The apparatus according to claim 1, wherein the communication apparatus is a communication apparatus of a wireless LAN compliant with the IEEE 802.11 series standard, and the communication unit joins the first network as a station, and forms the third network as an access point.

7. The apparatus according to claim 6, wherein the communication unit performs communication using the third network as a Group Owner in Wi-Fi Direct®.

8. The apparatus according to claim 6, wherein in a case where the communication apparatus receives the instruction of roaming from the other communication apparatus in a state in which the third network is not formed, the change unit does not change the frequency channel to be used in the third network, and the execution unit executes roaming.

9. The apparatus according to claim 6, wherein the change unit reactivates a function as the access point, forms a network that uses the third frequency channel, and instructs, by using a BTM Request frame, a station connected to the third network about roaming to the network that uses the third frequency channel.

10. The apparatus according to claim 6, wherein the change unit transmits a Channel Switch Announcement frame to a station connected to the third network, and changes a frequency channel used in the station to the third frequency channel.

11. The apparatus according to claim 1, wherein the communication apparatus is a communication apparatus of a wireless LAN compliant with the IEEE 802.11 series standard, and the communication unit joins the first network as a station, and also joins the third network as a station.

12. The apparatus according to claim 1, wherein the instruction of roaming includes one or more of the second networks as a roaming destination candidate, and also includes information representing priority for the one or more of the second networks, and the determination unit determines, in order from the second network of high priority, whether the first frequency channel used in the second network and the second frequency channel have the mutual interference relationship.

13. The apparatus according to claim 1, wherein the third frequency channel is selected as a frequency channel different from a frequency channel used in the first network, in addition to the first frequency channel.

14. The apparatus according to claim 1, wherein the instruction of roaming from the other communication apparatus is received by a BTM Request frame.

15. The apparatus according to claim 14, wherein information of the second network is notified in a BSS Transition Candidate List in the BTM Request frame.

16. The apparatus according to claim 1, wherein in a case where the first frequency channel and the second frequency channel have the mutual interference relationship, the determination unit further determines whether the frequency channel used in the third network can be changed to the third frequency channel, and the communication apparatus further comprises a notification unit configured to, in a case where the frequency channel used in the third network cannot be changed to the third frequency channel, notify the other communication apparatus that roaming cannot be executed with respect to the instruction of roaming.

17. A control method executed by a communication apparatus that wirelessly performs communication, the method comprising:

determining, in a case where an instruction of roaming from a first network to a second network is received from another communication apparatus after connecting to the first network, whether a first frequency channel used in the second network, and a second frequency channel used in a third network in which the communication apparatus can perform communication concurrently with the first network have a mutual interference relationship;

changing, based on a fact that the first frequency channel and the second frequency channel have the mutual interference relationship, a frequency channel used in the third network to a third frequency channel having no mutual interference relationship with the first frequency channel; and executing roaming based on the instruction of roaming.

18. A non-transitory computer-readable storage medium that stores a program for causing a computer included in a communication apparatus that wirelessly performs communication to perform a method, the method comprising:

determining, in a case where an instruction of roaming from a first network to a second network is received from another communication apparatus after connecting to the first network, whether a first frequency channel used in the second network, and a second frequency channel used in a third network in which the communication apparatus can perform communication concurrently with the first network have a mutual interference relationship;

changing, based on a fact that the first frequency channel and the second frequency channel have the mutual interference relationship, a frequency channel used in the third network to a third frequency channel having no mutual interference relationship with the first frequency channel; and executing roaming based on the instruction of roaming.

* * * * *